(12) United States Patent
Choi

(10) Patent No.: US 9,593,520 B2
(45) Date of Patent: Mar. 14, 2017

(54) SLIDING DOOR MODULE STRUCTURE FOR VEHICLE

(71) Applicant: Hyundai Motor Company, Seoul (KR)

(72) Inventor: Jae Hong Choi, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/875,509

(22) Filed: Oct. 5, 2015

(65) Prior Publication Data

US 2016/0362923 A1    Dec. 15, 2016

(30) Foreign Application Priority Data

Jun. 10, 2015   (KR) .................. 10-2015-0082007

(51) Int. Cl.
   *E06B 3/46*      (2006.01)
   *E05D 15/30*    (2006.01)
   *B60J 5/06*      (2006.01)

(52) U.S. Cl.
   CPC ............... *E05D 15/30* (2013.01); *B60J 5/06* (2013.01); *E06B 3/4636* (2013.01); *E05Y 2900/531* (2013.01)

(58) Field of Classification Search
   CPC ...... B60J 5/06; B60J 5/047; B60J 5/12; E05Y 2900/531; E05D 15/1081; E05D 15/101; E05D 15/1047; E05D 15/1086
   See application file for complete search history.

(56) References Cited

U.S. PATENT DOCUMENTS

| 4,025,104 | A   | * | 5/1977  | Grossbach  | E05D 15/1081 296/155 |
| 4,135,760 | A   |   | 1/1979  | Grossbach  |                      |
| 4,945,677 | A   | * | 8/1990  | Kramer     | B60J 5/06 296/155    |
| 6,183,039 | B1  | * | 2/2001  | Kohut      | E05D 15/1081 296/146.12 |
| 6,435,600 | B1  | * | 8/2002  | Long       | B60J 5/06 296/155    |
| 6,793,268 | B1  | * | 9/2004  | Faubert    | B60J 5/06 296/146.11 |
| 7,887,118 | B2  | * | 2/2011  | Elliott    | B60J 5/06 296/146.12 |
| 7,950,719 | B2  | * | 5/2011  | Elliott    | B60J 5/0479 296/155  |
| 2006/0249983 | A1 | * | 11/2006 | Heuel     | B60J 5/06 296/155    |
| 2008/0100091 | A1 | * | 5/2008  | Kunishima | B60J 5/06 296/146.1  |
| 2009/0051194 | A1 | * | 2/2009  | Elliott   | B60J 5/0479 296/146.11 |

(Continued)

FOREIGN PATENT DOCUMENTS

JP      5-18927 U      3/1993
JP      2001-341528 A  12/2001

(Continued)

*Primary Examiner* — Justin Rephann
(74) *Attorney, Agent, or Firm* — Morgan, Lewis & Bockius LLP

(57) ABSTRACT

A sliding door module structure for a vehicle may include a module bracket on which a door associated component is mounted, and a door rail formed integrally with the module bracket and coupled with a slider configured to be connected to a vehicle body to be movable.

7 Claims, 4 Drawing Sheets

(56) References Cited

U.S. PATENT DOCUMENTS

| | | | |
|---|---|---|---|
| 2009/0200833 A1* | 8/2009 | Heuel | B60J 5/06 296/155 |
| 2013/0269259 A1 | 10/2013 | Hendren et al. | |
| 2015/0167370 A1* | 6/2015 | Choi | E05D 13/04 403/83 |
| 2015/0183303 A1* | 7/2015 | Choi | B60J 5/047 49/405 |
| 2015/0183304 A1* | 7/2015 | Choi | B60J 5/047 49/405 |
| 2016/0130852 A1* | 5/2016 | Choi | E05F 15/00 49/404 |

FOREIGN PATENT DOCUMENTS

| | | |
|---|---|---|
| JP | 4753039 B2 | 8/2011 |
| KR | 10-2008-0098539 A | 11/2008 |
| KR | 10-1074174 B1 | 10/2011 |

* cited by examiner

SLIDING DOOR MODULE STRUCTURE FOR VEHICLE

CROSS-REFERENCE TO RELATED APPLICATION

The present application claims priority to Korean Patent Application No. 10-2015-0082007 filed Jun. 10, 2015, the entire contents of which is incorporated herein for all purposes by this reference.

BACKGROUND OF THE INVENTION

Field of the Invention

The present invention relates to a sliding door module structure for a vehicle, and more particularly, to a sliding door module structure for a vehicle, in which a center rail mounted on a sliding door is mounted on a door inner panel while being integrated with a door module bracket to improve assemble-ability and strength of a sliding door.

Description of Related Art

In general, a vehicle compartment having a predetermined size, which a driver or an accompanied passenger thereof can board is formed in a vehicle and a vehicle compartment opening/closing door is installed in a vehicle body in order to open/close the vehicle compartment.

In the case of a car, the vehicle compartment opening/closing door includes a front door installed in a front side of a car in the longitudinal direction of the vehicle and a rear door installed in a rear side of the car in the longitudinal direction of the vehicle and the front door and the rear door are generally installed in a vehicle body to be rotatable via a hinge.

In the case of a van in which a lot of people can ride, the vehicle compartment opening/closing door is configured to open/close the vehicle compartment while slidably moving forward and backward in the longitudinal direction of the vehicle.

In the case of a sliding type vehicle compartment opening/closing door of the van, the vehicle compartment opening/closing door opens the vehicle compartment by moving backward in the longitudinal direction of the vehicle and closes the vehicle compartment by moving forward in the longitudinal direction of the vehicle, and as a result, an opening/closing required space required for opening/closing the door is smaller than the hinge type vehicle compartment opening/closing door of the car and a door opening formed in the vehicle body can be fully opened even in the small opening/closing required space.

However, the sliding type vehicle compartment opening/closing door in the related art requires three support and guide rails supporting an upper portion, a middle portion, and a lower portion of the door while opening/closing the door and components related therewith to increase a weight and the number of components of the vehicle and degrade a degree of freedom of a design of the vehicle.

As a result, in recent years, a sliding door device for a vehicle is developed, which guides and supports a sliding door only by a center rail mounted on a sliding door and a lower rail mounted on the vehicle body to decrease the number of rails of the sliding door and the number of components associated therewith, thereby improving productivity and fuel efficiency, and assimilability and productivity of the sliding door need to be improved and strength of the sliding door needs to be increased by modulating the center rail in the sliding door device for the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sliding door module structure for a vehicle, which improves assemble-ability and productivity of a 2-rail type sliding door device for the vehicle and increases strength of a sliding door by modulating a center rail mounted on the sliding door to thereby effectively cope with a side collision.

According to various aspects of the present invention, a sliding door module structure for a vehicle may include a module bracket on which a door associated component is mounted, and a door rail formed integrally with the module bracket and coupled with a slider configured to be connected to a vehicle body to be movable.

The door rail may be fixedly mounted on a door inner panel.

The module bracket and the door rail which may be formed of a plastic material are integrally injection-molded.

The door rail may be formed to protrude to an inside of a vehicle compartment rather than the door inner panel, and formed to extend in a longitudinal direction of the vehicle to include each of a front fore-end and a rear fore-end, and the front fore-end and the rear fore-end are mounted on the door inner panel through a mounting bracket.

The mounting bracket may have a rectangular plate shape, and both fore-ends in the longitudinal direction thereof may be fastened to upper and lower portions of the door inner panel in a height direction of the vehicle and each of the front fore-end and the rear fore-end of the door rail may be supported while being inserted between the mounting bracket and the door inner panel.

The door rail may include a rail body having a rectangular block shape, an upper guide rail integrally formed in the rain body and deployed at an upper portion in the height direction of the vehicle, and a lower guide rail deployed at a lower portion in a height direction of the vehicle.

A slider may be coupled to the door rail to move along the door rail, a first end of a swing arm may be relatively rotatably fastened to the slider, and a second end of the swing arm may be configured to be relatively rotatably fastened to the vehicle body.

A reinforcing member may be inserted into each of the upper guide rail and the lower guide rail.

The slider may include two slider blocks into which the upper guide rail and the lower guide rail are inserted, respectively, multiple rollers which are inserted into the two slider blocks, respectively and rollably move while contacting the upper guide rail and the lower guide rail, respectively, and a support bracket connecting and fixing the two slider blocks and relatively rotatably fastened with one end of the swing arm.

The mounting bracket may include two support grooves having an arc shape, into which the upper guide rail and the lower guide rail are inserted, respectively to be supported, a support flange deployed between two support grooves and supporting the rail body while surface-contacting the rail body, and a fastening flange which extends from each of the support grooves to be fastened to the door inner panel.

According to various embodiments of the present invention, by a sliding door module structure for a vehicle, a door rail guiding a sliding motion of a sliding door is mounted on a door inner panel while being integrated with a module bracket to improve assemble-ability and productivity of the sliding door.

The sliding door is mounted on the sliding door to extend forward/backward in the width direction of the sliding door, that is, the longitudinal direction of the vehicle and deployed substantially at a central portion in the height direction of the sliding door, that is, the height direction of the vehicle to increase structural strength of the sliding door, and as a result, an impact beam mounted on a door for coping with a side collision in the related art is not required, thereby reducing the number of components, a weight, and manufacturing cost of the sliding door.

Further, two upper and lower guide rails having a circular rod shape, which guide a slider are provided on the door rail and the slider can thus stably slide on the two upper and lower guide rails, thereby improving opening/closing operability of the sliding door.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
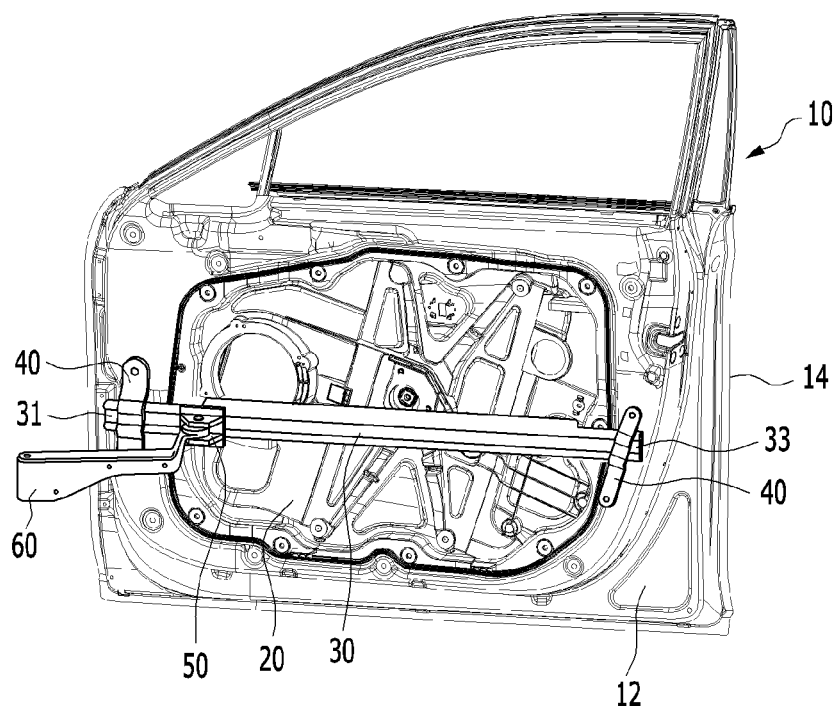
FIG. 1 is a front view of an exemplary sliding door module structure for a vehicle according to the present invention.

Referring to FIG. 1, in a sliding door 10 for a vehicle, which adopts a sliding door module structure for the vehicle according to various embodiments of the present invention, a door inner panel 12 and a door outer panel 14 are combined with each other to form a door frame.

The sliding door module structure for the vehicle according to various embodiments of the present invention may include a module bracket 20 in which door associated components such as a door speaker or a door window glass regulator are installed and which is fastened and supported onto the door inner panel 12 and a door rail 30 integrally formed in the module bracket 10.

The module bracket 20 and the door rail 30 may be integrally injection-molded by using, for example, a plastic material.

When the module bracket 20 and the door rail 30 are integrally modulated to be provided to an assembly line of the vehicle, assemble-ability and productivity of the sliding door may be improved.

The door rail 30 may be formed to protrude to the inside of a vehicle compartment rather than the door inner panel 12 and formed to extend in the width direction of the door, that is, the longitudinal direction of the vehicle and each of a front fore-end 31 and a rear fore-end 33 in the longitudinal direction of the vehicle may be mounted and supported on the door inner panel 12 through a mounting bracket 40.

The mounting bracket 40 has a substantially rectangular plate shape, and both fore-ends 31, 33 in the longitudinal direction thereof are fastened to upper and lower portions of the door inner panel 12 in the height direction of the door, that is, the height direction of the vehicle and each of the front fore-end 31 and the rear fore-end 33 of the door rail 30 may be supported while being inserted between the mounting bracket 40 and the door inner panel 12.

The door rail 30 is formed to extend forward and backward in the longitudinal direction of the vehicle and deployed substantially around the central portion in the height direction of the door, and as a result, support rigidity of the sliding door 10 is increased to effectively cope with a side collision of the vehicle. Therefore, an impact beam mounted for coping with the side collision of the door in the related art is not required to reduce the number of components, a weight, and manufacturing cost of the sliding door.

A slider 50 may be coupled to the door rail 30 to move along the door rail 30, one end of a swing arm 60 may be relatively rotatably fastened to the slider 50 with a pin, and the other end of the swing arm 60 may be relatively rotatably fastened to a vehicle body with the pin.

As a result, the sliding door 10 is rotatably supported on the vehicle body through the swing arm 60 and slidably moves forward and backward in the longitudinal direction of the vehicle through the door rail 30 coupled to the slider 50 to open/close a door opening formed in the vehicle body.

Figure 2:
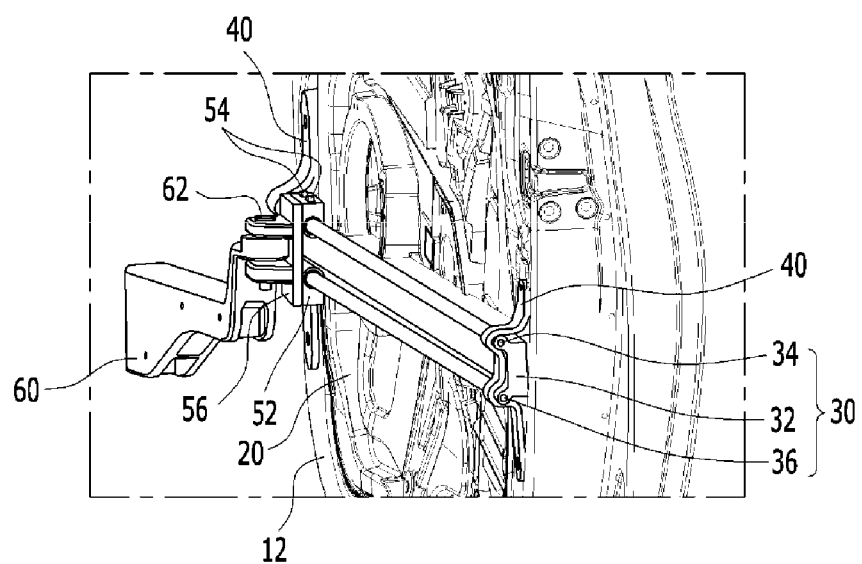
FIG. 2 is a partial cut rear perspective view of the exemplary sliding door module structure for the vehicle according to the present invention.
Figure 3:
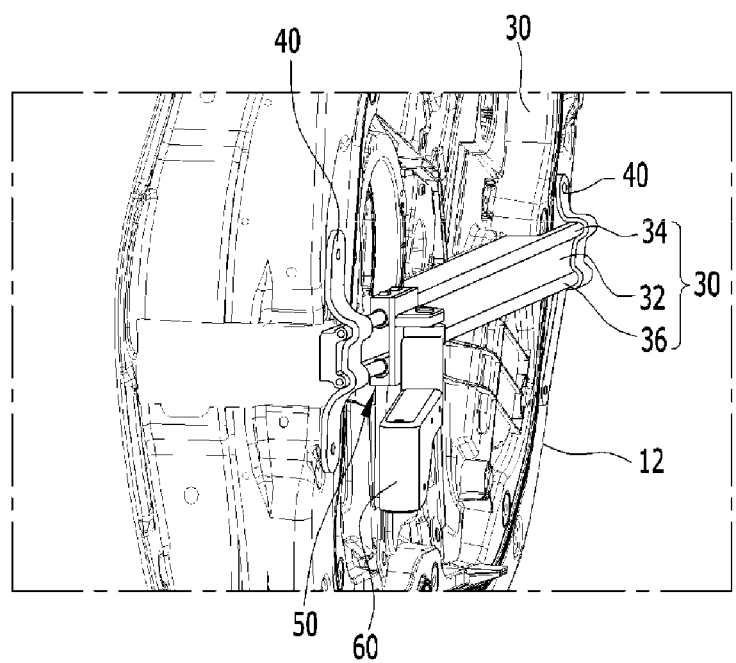
FIG. 3 is a partial cut front perspective view of the exemplary sliding door module structure for the vehicle according to the present invention.

Referring to FIGS. 2 and 3, the door rail 30 may include a rail body 32 having a substantially rectangular block shape, an upper guide rail 34 formed integrally with the rail body 32 and deployed at an upper portion in the height direction of the door, and a lower guide rail 36 deployed at a lower portion.

Figure 4:
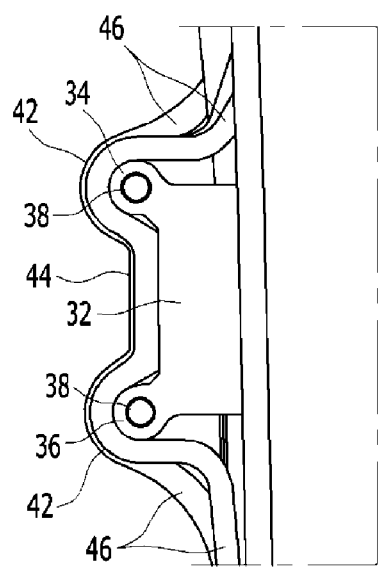
FIG. 4 is a side view of a door rail of the exemplary sliding door module according to the present invention.

Each of the upper guide rail 34 and the lower guide rail 36 may have a circular rod shape and as illustrated in FIG. 4, for example, an iron core 38 as a reinforcing member may be inserted into each of the upper guide rail 34 and the lower guide rail 36 in order to increase the rigidity.

The slider 50 may include each of two slider blocks 52 into which the upper guide rail 34 and the lower guide rail 36 are inserted, respectively, multiple rollers 54 which are inserted into two slider blocks 52, respectively and rollably move while contacting the upper guide rail 34 and the lower guide rail 36, respectively, and a support bracket 56 connecting and fixing the two slider blocks 52 and fastened with one end of the swing arm 60 with a pin 62.

Two upper and lower guide rails 34 and 36 having the circular rod shape, which guide the slider 50, are provided on the door rail 30 as described above, and as a result, the slider 50 may stably slidably move along two upper and lower guide rails 34 and 36, thereby improving opening/closing operability of the sliding door.

Referring to FIG. 4, the mounting bracket 40 may include two support grooves 42 having a substantially arc shape, into which the upper guide rail 34 and the lower guide rail 36 are inserted, respectively to be supported not to move, a support flange 44 deployed between the two support grooves 42 and supporting the rail body 32 not to move while surface-contacting the rail body 32, and a fastening flange 46 which extends from each of the support grooves 42 to be fastened to the door inner panel 12.

The support groove 42 and the support flange 44 of the mounting bracket 40 may support the door rail 30 to be stably mounted on the door inner panel 12 not to move.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding door module structure for a vehicle, comprising:
   a module bracket; and
   a door rail formed integrally with the module bracket and coupled with a slider configured to be connected to a vehicle body to be movable,
   wherein the door rail is formed to protrude to an inside of a vehicle compartment, and the door rail is formed to extend in a longitudinal direction of the vehicle to include each of a front fore-end and a rear fore-end, and the front fore-end and the rear fore-end are each mounted on a door inner panel through a mounting bracket,
   wherein the door rail includes: a rectangular rail body;
   a curved upper guide rail integrally formed with the rectangular rail body and protruding from an upper portion of the rail body in a height direction of the vehicle; and
   a curved lower guide rail protruding from a lower portion of the rail body in the height direction of the vehicle, and wherein the mounting bracket includes:
   two support grooves, into which the upper guide rail and the lower guide rail are inserted, respectively to be supported;
   a support flange deployed between two support grooves and supporting the rectangular rail body while surface-contacting the rectangular rail body; and
   a fastening flange which extends from each of the support grooves to be fastened to the door inner panel.

2. The sliding door module structure of claim 1, wherein the door rail is fixedly mounted on the door inner panel.

3. The sliding door module structure of claim 1, wherein the module bracket and the door rail which are formed of a plastic material are integrally injection-molded.

4. The sliding door module structure of claim 1, wherein upper and lower ends of the mounting bracket in the longitudinal direction thereof are fastened to upper and lower portions of the door inner panel in the height direction of the vehicle and each of the front fore-end and the rear fore-end of the door rail is supported while being inserted between the mounting bracket and the door inner panel.

5. The sliding door module structure of claim 1, wherein a slider is coupled to the door rail to move along the door rail, a first end of a swing arm is relatively rotatably fastened to the slider, and a second end of the swing arm is configured to be relatively rotatably fastened to the vehicle body.

6. The sliding door module structure of claim 5, wherein the slider includes:
   two slider blocks into which the upper guide rail and the lower guide rail are inserted, respectively;
   multiple rollers which are inserted into the two slider blocks, respectively and rollably move while contacting the upper guide rail and the lower guide rail, respectively; and
   a support bracket connecting and fixing the two slider blocks and relatively rotatably fastened with one end of the swing arm.

7. The sliding door module structure of claim 1, wherein a reinforcing member is inserted into each of the upper guide rail and the lower guide rail.

* * * * *